United States Patent
Khanlarov et al.

(10) Patent No.: US 8,905,414 B2
(45) Date of Patent: Dec. 9, 2014

(54) STABILIZER ARRANGEMENT FOR A CHASSIS OF A MOTOR VEHICLE

(71) Applicant: Dr. Ing. h.c. F. Porsche Aktiengesellschaft, Stuttgart (DE)

(72) Inventors: Jafar Khanlarov, Weissach-Flacht (DE); Eric Begenau, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/073,109

(22) Filed: Nov. 6, 2013

(65) Prior Publication Data

US 2014/0125028 A1 May 8, 2014

(30) Foreign Application Priority Data

Nov. 7, 2012 (DE) .......................... 10 2012 110 656

(51) Int. Cl.
*B60G 21/055* (2006.01)

(52) U.S. Cl.
CPC ..................................... *B60G 21/055* (2013.01)
USPC .................................. 280/124.106; 280/5.511

(58) Field of Classification Search
USPC .......................... 280/5.511, 124.106, 125.152
See application file for complete search history.

(56) References Cited

U.S. PATENT DOCUMENTS

| | | | |
|---|---|---|---|
| 4,796,911 A | 1/1989 | Kuroki et al. | |
| 5,839,552 A | 11/1998 | Vandewal et al. | |
| 6,737,771 B2 * | 5/2004 | Fujita et al. | 310/68 B |
| 7,322,580 B2 * | 1/2008 | Suzuki et al. | 280/5.502 |
| 7,543,823 B2 * | 6/2009 | Buma et al. | 280/5.502 |
| 7,905,499 B2 * | 3/2011 | Buma et al. | 280/5.511 |
| 8,684,365 B2 * | 4/2014 | Kondo | 280/5.506 |
| 2007/0182110 A1 * | 8/2007 | Urababa | 280/5.508 |

FOREIGN PATENT DOCUMENTS

| | | |
|---|---|---|
| DE | 196 19 498 A1 | 2/1997 |
| DE | 10 2007 040 185 A1 | 2/2009 |
| DE | 10 2008 041 329 A1 | 3/2010 |
| DE | 10 2010 053 732 A1 | 4/2012 |

OTHER PUBLICATIONS

German International Search Report DE 10 2012 110 656.8 dated Jun. 20, 2013 with partial English translation.

* cited by examiner

*Primary Examiner* — Drew Brown
(74) *Attorney, Agent, or Firm* — RatnerPrestia

(57) ABSTRACT

A stabilizer arrangement for a chassis of a motor vehicle, having at least one actuator which compensates for vehicle movements entirely or partially in the region of a wheel suspension which is connected to the stabilizer arrangement, wherein the actuator can be actuated via flexible lines. The actuator is connected to a central control unit via flexible lines to be routed from the central control unit, via openings which are arranged in a stabilizer bearing, to the actuator which interacts with a stabilizer, wherein the flexible lines are arranged around the stabilizer in a helical manner, and operation of the actuator causes a change in the diameter of the helix or the helix shape of the flexible lines which are laid in a helical manner.

9 Claims, 1 Drawing Sheet

STABILIZER ARRANGEMENT FOR A CHASSIS OF A MOTOR VEHICLE

CROSS-REFERENCE TO RELATED APPLICATIONS

This application claims priority of German Patent Application No. 10 2012 110 656.8, filed Nov. 7, 2012, which is incorporated by reference herein in its entirety.

FIELD OF INVENTION

The invention relates to a stabilizer arrangement for a chassis of a motor vehicle, having at least one actuator which compensates for vehicle movements entirely or partially in the region of a wheel suspension which is connected to the stabilizer arrangement, wherein the actuator can be actuated via flexible lines.

Laying flexible lines to the hydraulic or electrical supply system in a motor vehicle is problematical, in particular in the region of the vehicle axles or wheel suspension since, during operation, vehicle parts, for example wheels and the wheel suspension, execute not inconsiderable relative movements with respect to the vehicle parts surrounding them. However, for the reliable operation of a vehicle, it is absolutely necessary to reliably protect the laid lines not only against damage due to objects acting on the vehicle from the outside, for example stones striking said vehicle, but also, in particular, against damage due to, for example, relative movements of this kind or due to chafing movements against other parts of the vehicle. It is particularly problematical to route the lines in the case of motor vehicles which are equipped with systems with which movements of the vehicle about the longitudinal, transverse and/or vertical axes are intended to be entirely or partially compensated for. In order to be able to achieve said compensation, actuators are arranged in the region of the chassis and are actuated hydraulically and/or electrically by a control unit, which is usually arranged centrally in the vehicle, via flexible supply lines which are laid in the region of the chassis. Lines of this kind are very particularly exposed to the abovementioned relative movements. However, these lines are also at risk because they have to be arranged relatively close to the ground and in the immediate vicinity of the rotating wheels.

BACKGROUND

DE 10 2008 041 329 A1 discloses a stabilizer arrangement in which a line runs on a specific longitudinal section in a helical manner in relation to the longitudinal axis of the stabilizer. In the case of the stabilizer arrangement which is already known, it is of little advantage that only one line runs to the actuator and that a plurality of lines are combined in one line since combination of the lines in this way leads to said lines not having a particularly high degree of flexibility.

SUMMARY

The present invention is based on the object of proposing a line routing means in a stabilizer arrangement for a chassis of a motor vehicle which ensures a high degree of protection against damage due to relative movements of the vehicle and also due to external influences, and also allows direct laying paths in the vehicle which are as short as possible.

This object is achieved by a stabilizer arrangement for a chassis of a motor vehicle, having at least one actuator which compensates for vehicle movements entirely or partially in the region of a wheel suspension which is connected to the stabilizer arrangement, wherein the actuator can be actuated via flexible lines characterized, in that the flexible lines are routed from a central control unit, via openings which are arranged in the stabilizer bearing, to the actuator which interacts with a stabilizer, wherein the flexible lines are arranged around the stabilizer in a helical manner, and operation of the actuator causes a change in the diameter of the helix.

In said arrangement, provision is made for the flexible lines to be routed from a central control unit, via openings which are arranged in the stabilizer bearing, to the actuator which interacts with a stabilizer, wherein the flexible lines are arranged around the stabilizer in a helical manner, and operation of the actuator causes a change in the diameter of the helix. In this case, the diameter of the helix corresponds at most to the diameter of the actuator, in order to allow a particularly installation-space-saving arrangement.

The subject matter of the invention makes provision for the flexible lines to be in the form of electrical lines, and for the compensating actuator to be an electromechanical actuator. In order to keep the degree of flexibility as high as possible, provision is made for the flexible, electrical lines to each be individually shielded and to each be individually routed. As a result, a greater degree of flexibility is achieved than in the case of the lines being routed in a common line in which a common shield leads to a rigid composite line.

A particularly advantageous development of the subject matter of the invention makes provision for a further flexible line to be provided, said line being routed through the stabilizer bearing and being arranged around the stabilizer in a helical manner. In this case, the invention makes provision for the further flexible line to be an electrical signal line which is connected to a sensor and which conducts the output signals from this sensor to a control unit.

Provision is made for the openings to be arranged in the stabilizer bearing next to one another substantially beneath and/or above the stabilizer as seen in the vertical direction of the vehicle. As an alternative, these openings are arranged one above the other substantially on the left-hand side and/or right-hand side of the stabilizer as seen in the vertical direction of the vehicle.

BRIEF DESCRIPTION OF THE DRAWINGS

The present invention will be explained in greater detail with reference to an exemplary embodiment. In the drawing.

DETAILED DESCRIPTION

Figure 1:
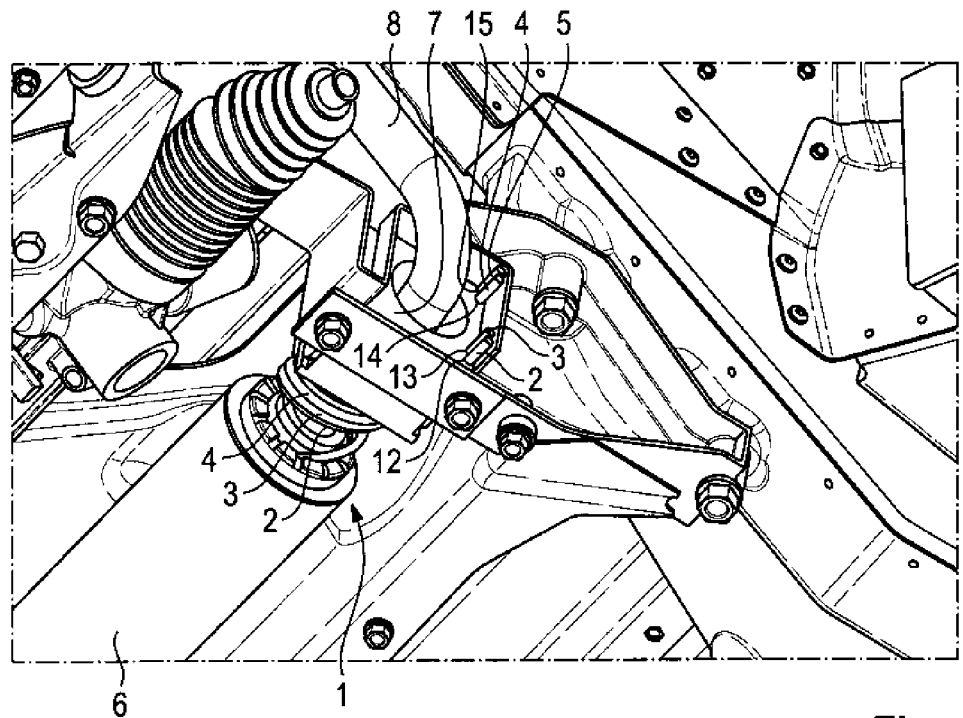
FIG. 1 shows a plan view of the stabilizer arrangement according to the invention.

FIG. 1 shows a plan view of the stabilizer arrangement according to the invention. The stabilizer arrangement 1 has an actuator 6 which is connected to a stabilizer 8. Vehicle movements are transmitted to the actuator 6 by means of the stabilizer 8, wherein the actuator is designed to execute a rotary movement. This rotary movement absorbs the forces which result from the vehicle movement. For this purpose, the stabilizer 8 is connected to the vehicle body and will be routed through a stabilizer bearing 7 and connected to the actuator 6. In this case, the actuator 6 is an electromechanical actuator. Accordingly, the supply lines for the actuator 6 are in the form of electrical lines. The arrangement proposed in the text which follows cannot be carried out with a hydraulic actuator and hydraulic supply lines since hydraulic lines and/or hoses cannot be laid with sufficiently small radii.

As shown in FIG. 1, both a possibly polyphase electrical supply line for the actuator 6 and also a total of three flexible lines 2, 3, 4 are provided. In the prior art, a plurality of supply lines are routed within a common line. This has the disadvantage that a common line does not have an adequate degree of flexibility. Starting from the actuator 6, the flexible lines 2, 3, 4 are individually arranged around the stabilizer 8 in a helical manner. To this end, the flexible lines 2, 3, 4 are individually shielded against external electromagnetic influences. The electromechanical actuator is in the form of a brushless DC motor, and the flexible, electrical lines 2, 3, 4 are each associated with one phase U, V, W of the brushless electric motor.

In the event of a rotary movement of the actuator 6, the diameter of the helix of the flexible lines 2, 3, 4 which are laid in a helical manner changes. The change in the diameter of the helix is caused by a change in length of the flexible lines 2, 3, 4.

As can further be seen in FIG. 1, the flexible lines 2, 3, 4 are routed through openings 12, 13, 14 which are arranged in the stabilizer bearing 7. A further line which is designed as a sensor line 5 in the present exemplary embodiment is routed through a further opening 15 in the stabilizer bearing 7. The stabilizer bearing 7 is produced from a rubber-elastic material. The flexible lines 2, 3, 4 which are routed through the stabilizer bearing 7 are further routed to a central control unit (not illustrated) which as designed as an electrical control unit. The openings 12, 13, 14 and 15 in the stabilizer bearing 7 are either arranged next to one another substantially beneath and/or above the stabilizer 8 as seen in the vertical direction of the vehicle or one above the other substantially on the left-hand side and/or right-hand side of the stabilizer 8 as seen in the vertical direction of the vehicle.

The essential concept of the invention is that a total of three flexible lines 2, 3, 4 are used to supply the actuator 6, wherein the flexible lines 2, 3, 4 are arranged around the stabilizer 8 in a helical manner and are subsequently routed through openings 12, 13, 14 in the stabilizer bearing 7.

Figure 2:
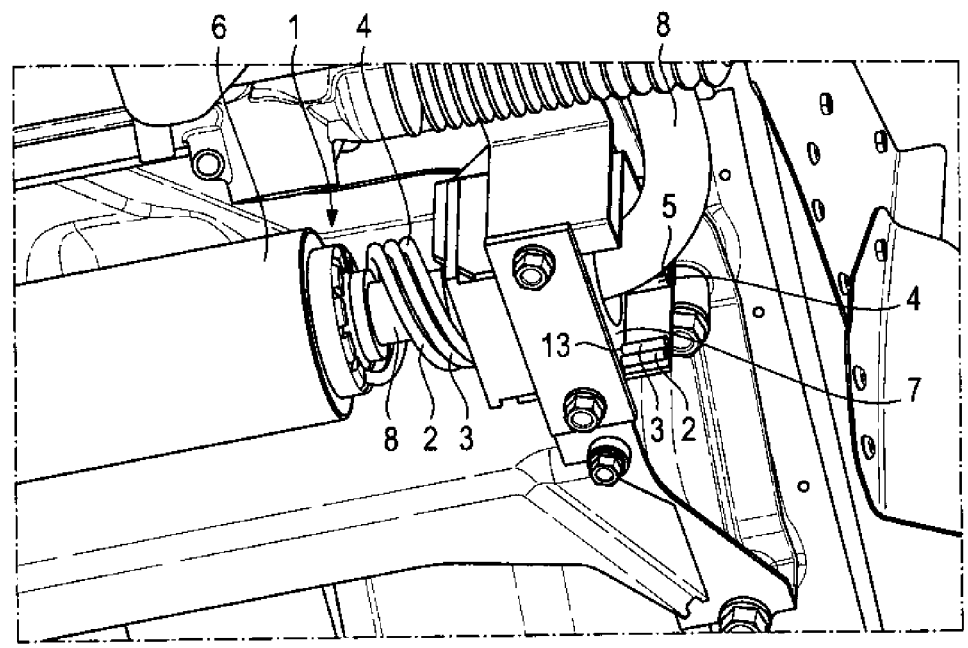
FIG. 2 shows an illustration of the stabilizer arrangement according to the invention which is tilted in comparison to FIG. 1.

FIG. 2 shows an illustration which corresponds to FIG. 1, wherein an angle of view which is changed somewhat clearly shows that the flexible lines 2, 3, 4 are laid around the stabilizer 8 in a helical manner. FIG. 2 further clearly shows that a rotary movement of the actuator 6 leads to a change in the diameter of the helix shape. As shown in FIG. 2, the combination of laying the flexible lines 2, 3, 4 in a helical manner and subsequently routing the flexible lines 2, 3, 4 into the openings 12, 13, 14 in the stabilizer bearing 7 leads to compact and at the same time well-protected laying of the lines. This way of laying the lines additionally has acoustic advantages since the lines 2, 3, 4 cannot strike other components and therefore no noise development Is generated.

In FIGS. 1 and 2, the openings 12, 13, 14 in the stabilizer bearing 7 are arranged substantially one above the other as seen in the vertical direction of the vehicle. In this case, it is obvious that the openings 12, 13, 14 can be arranged one above the other either on the left-hand side or right-hand side of the stabilizer 8. It is likewise obvious that the openings 12, 13, 14 can be arranged next to one another substantially beneath and/or above the stabilizer 8 as seen in the vertical direction of the vehicle.

Routing a total of three electrical lines 2, 3, 4 through openings 12, 13, 14 in the stabilizer bearing 7 and laying the flexible, electrical lines 2, 3, 4 around the stabilizer 8 in a helical manner provide a particularly advantageous solution for connecting an actuator 6 to a central control unit.

The invention claimed is:

1. A stabilizer arrangement (1) for a chassis of a motor vehicle, having at least one actuator (6) which compensates for vehicle movements entirely or partially in the region of a wheel suspension which is connected to the stabilizer arrangement (1), wherein the actuator (6) can be actuated via flexible lines (2, 3, 4), wherein the flexible lines (2, 3, 4) are routed from a central control unit, via openings (12, 13, 14) which are arranged in the stabilizer bearing (7), to the actuator (6) which interacts with a stabilizer (8), wherein the flexible lines (2, 3, 4) are arranged around the stabilizer (8) in a helical manner, and operation of the actuator (6) causes a change in the diameter of the helix.

2. The stabilizer arrangement (1) as claimed in claim 1, wherein the flexible lines (2, 3, 4) are electrical lines, and the compensating actuator (6) is an electromechanical actuator.

3. The stabilizer arrangement (1) as claimed in claim 2, wherein the flexible, electrical lines (2, 3, 4) are each individually shielded.

4. The stabilizer arrangement (1) as claimed in claim 2, wherein the electromechanical actuator is in the form of a brushless DC motor, and the flexible, electrical lines (2, 3, 4) are each associated with one phase (U, V, W) of the brushless electric motor.

5. The stabilizer arrangement (1) as claimed in claim 1, wherein a further flexible line (5) is provided, said line being routed through the stabilizer bearing (7) and being arranged around the stabilizer (8) in a helical manner.

6. The stabilizer arrangement (1) as claimed in claim 5, wherein the further flexible line (5) is an electrical signal line which is connected to a sensor.

7. The stabilizer arrangement (1) as claimed in claim 1, wherein the openings (12, 13, 14) are arranged next to one another substantially beneath and/or above the stabilizer (8) as seen in the vertical direction of the vehicle.

8. The stabilizer arrangement (1) as claimed in claim 1, wherein the openings (12, 13, 14) are arranged one above the other substantially on the left-hand side and/or right-hand side of the stabilizer (8) as seen in the vertical direction of the vehicle.

9. The stabilizer arrangement (1) as claimed in claim 3, wherein the electromechanical actuator is in the form of a brushless DC motor, and the flexible, electrical lines (2, 3, 4) are each associated with one phase (U, V, W) of the brushless electric motor.

* * * * *